US012580271B2

(12) United States Patent
Lee et al.

(10) Patent No.: US 12,580,271 B2
(45) Date of Patent: Mar. 17, 2026

(54) SECONDARY BATTERY

(71) Applicant: LG Energy Solution, Ltd., Seoul (KR)

(72) Inventors: Ik Jong Lee, Daejeon (KR); Duk Hyun Ryu, Daejeon (KR); Jung Hoon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 511 days.

(21) Appl. No.: 18/006,250

(22) PCT Filed: Jul. 26, 2021

(86) PCT No.: PCT/KR2021/009674
§ 371 (c)(1),
(2) Date: Jan. 20, 2023

(87) PCT Pub. No.: WO2022/025577
PCT Pub. Date: Feb. 3, 2022

(65) Prior Publication Data
US 2023/0275314 A1 Aug. 31, 2023

(30) Foreign Application Priority Data
Jul. 28, 2020 (KR) ........................ 10-2020-0094042

(51) Int. Cl.
*H01M 50/383* (2021.01)
*H01M 10/0587* (2010.01)
(Continued)

(52) U.S. Cl.
CPC ..... *H01M 50/383* (2021.01); *H01M 10/0587* (2013.01); *H01M 50/171* (2021.01); *H01M 50/24* (2021.01)

(58) Field of Classification Search
CPC .. H01M 50/383; H01M 50/24; H01M 50/171; H01M 10/0587
See application file for complete search history.

(56) References Cited

U.S. PATENT DOCUMENTS 5,795,674 A * 8/1998 Shiota ................. H01M 50/342
429/224
6,451,478 B1 * 9/2002 Okahisa .............. H01M 50/109
429/162
(Continued)

FOREIGN PATENT DOCUMENTS

CN 103548175 A 1/2014
CN 209447923 U 9/2019
(Continued)

OTHER PUBLICATIONS

KR-101335285MT (Year: 2013).*
(Continued)

*Primary Examiner* — Alexander Usyatinsky
(74) *Attorney, Agent, or Firm* — Lerner David LLP

(57) ABSTRACT

A secondary battery includes an electrode assembly in which electrodes and separators are alternately stacked to be wound, a can configured to accommodate the electrode assembly therein, having an opening in an upper end thereof, and provided with a beading part that is bent inward to form a recessed groove, a cap assembly seated on the beading part to cover the opening of the can, an extinguishing agent accommodated in the recessed groove to extinguish ignition when the secondary battery is ignited, and a sealing part configured to seal the recessed groove.

9 Claims, 7 Drawing Sheets

100

(51) Int. Cl.
    *H01M 50/171*    (2021.01)
    *H01M 50/24*    (2021.01)

(56)        References Cited

U.S. PATENT DOCUMENTS

| | | | |
|---|---|---|---|
| 2007/0231679 | A1 | 10/2007 | Chang et al. |
| 2013/0277071 | A1* | 10/2013 | Schaefer ................... A62C 3/16 |
| | | | 169/70 |
| 2016/0043368 | A1 | 2/2016 | Kim |
| 2016/0226114 | A1* | 8/2016 | Hartmann .......... C08G 18/7671 |
| 2018/0123103 | A1 | 5/2018 | Kang et al. |
| 2019/0267685 | A1 | 8/2019 | Jeong et al. |
| 2019/0386285 | A1* | 12/2019 | Takahashi ......... H01M 10/0525 |
| 2020/0038698 | A1 | 2/2020 | Ryu et al. |
| 2020/0127335 | A1 | 4/2020 | Kim et al. |
| 2020/0144563 | A1 | 5/2020 | Lee et al. |
| 2020/0185666 | A1 | 6/2020 | Lee et al. |
| 2023/0124306 | A1 | 4/2023 | Lee et al. |

FOREIGN PATENT DOCUMENTS

| | | | |
|---|---|---|---|
| CN | 110832693 | A | 2/2020 |
| JP | 2011060644 | A | 3/2011 |
| JP | 2013544014 | A | 12/2013 |
| KR | 20070071237 | A | 7/2007 |
| KR | 20070097855 | A | 10/2007 |
| KR | 20090008071 | A | 1/2009 |
| KR | 20090026648 | A | 3/2009 |
| KR | 1020090062541 | A | 6/2009 |
| KR | 20120133203 | A | 12/2012 |
| KR | 20130063206 | A | 6/2013 |
| KR | 101335285 | B1 * | 12/2013 ......... H01M 50/152 |
| KR | 20140005653 | A | 1/2014 |
| KR | 20140015647 | A | 2/2014 |
| KR | 20150069779 | A | 6/2015 |
| KR | 20160019251 | A | 2/2016 |
| KR | 20170004720 | A | 1/2017 |
| KR | 20180047439 | A | 5/2018 |
| KR | 20180137292 | A | 12/2018 |
| KR | 20190072489 | A | 6/2019 |
| KR | 20190092232 | A | 8/2019 |
| KR | 20190099597 | A | 8/2019 |
| KR | 102041164 | B1 | 11/2019 |
| KR | 20190137543 | A | 12/2019 |
| KR | 20200032447 | A | 3/2020 |
| KR | 102127307 | B1 | 6/2020 |

OTHER PUBLICATIONS

International Search Report for PCT/KR2021/009674 mailed Nov. 1, 2023. 4 pgs.
Extended European Search Report including Written Opinion for Application No. 21850288.8 dated Sep. 2, 2024, pp. 1-7.
Search Report dated Jan. 16, 2026 from the Office Action for Chinese Application No. 202180048134.9 issued Jan. 17, 2026, pp. 1-2.

* cited by examiner

SECONDARY BATTERY

CROSS-REFERENCE TO RELATED APPLICATIONS

The present application is a national phase entry under 35 U.S.C. § 371 of the International Application No. PCT/KR2021/009674 filed on Jul. 26, 2021, which claims priority from Korean Patent Application No. 10-2020-0094042, filed on Jul. 28, 2020, all of which are incorporated herein by reference in their entireties.

FIELD OF THE INVENTION

The present invention relate to a secondary battery.

BACKGROUND OF THE INVENTION

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. The secondary battery accommodates an electrode assembly and an electrolyte. In such a secondary battery, an electrode assembly mounted in a battery case is a chargeable and dischargeable power generating device having a structure in which an electrode and a separator are stacked.

The electrode assembly may be approximately classified into a jelly roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

A cylindrical battery is constituted by a jelly roll-type electrode assembly and a can containing the electrode assembly.

The typical cylindrical battery has a risk of being ignited under various conditions (overcharge, a high temperature, and an external impact).

In addition, when the cylindrical battery is ignited, there is a problem that there is no device capable of extinguishing the fire by itself or preventing the fire from being spread.

BRIEF SUMMARY OF THE INVENTION OF THE INVENTION

One aspect of the present invention is to provide a secondary battery capable of be extinguished through a fire extinguishing agent when the battery is ignited.

A secondary battery according to an embodiment of the present invention comprises an electrode assembly in which electrodes and separators are alternately stacked to be wound, a can configured to accommodate the electrode assembly therein, having an opening in an upper end thereof, and provided with a beading part that is bent inward to form a recessed groove, a cap assembly seated on the beading part to cover the opening of the can, an extinguishing agent accommodated in the recessed groove to extinguish ignition when the secondary battery is ignited, and a sealing part configured to seal the recessed groove.

A battery pack according to an embodiment of the present invention may comprise the secondary battery according to an embodiment of the present invention.

According to the present invention, the extinguishing agent may be disposed in the beading part of the can, and a portion of the beading part in which the extinguishing agent is accommodated may be sealed by the sealing part to extinguish the fire through the extinguishing agent when the battery is ignited.

In addition, the extinguishing agent may be provided as the compressed extinguishing agent, which is ejected when the secondary battery is ignited, and thus may easily extinguish the fire in the surrounding space or prevent the fire from being spread.

DETAILED DESCRIPTION

Figure 1:
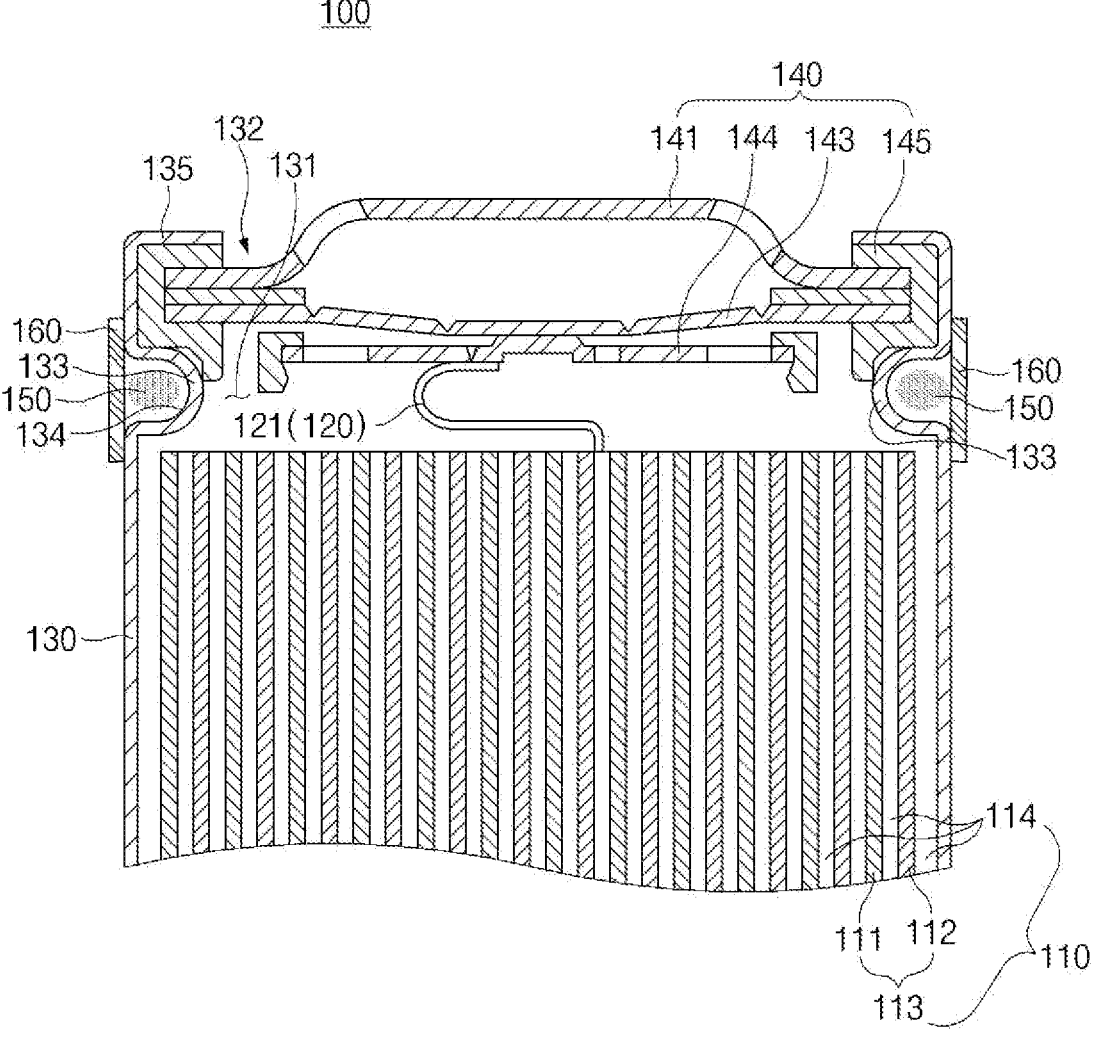
FIG. 1 is a cross-sectional view of a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Secondary Battery According to an Embodiment

Figure 2:
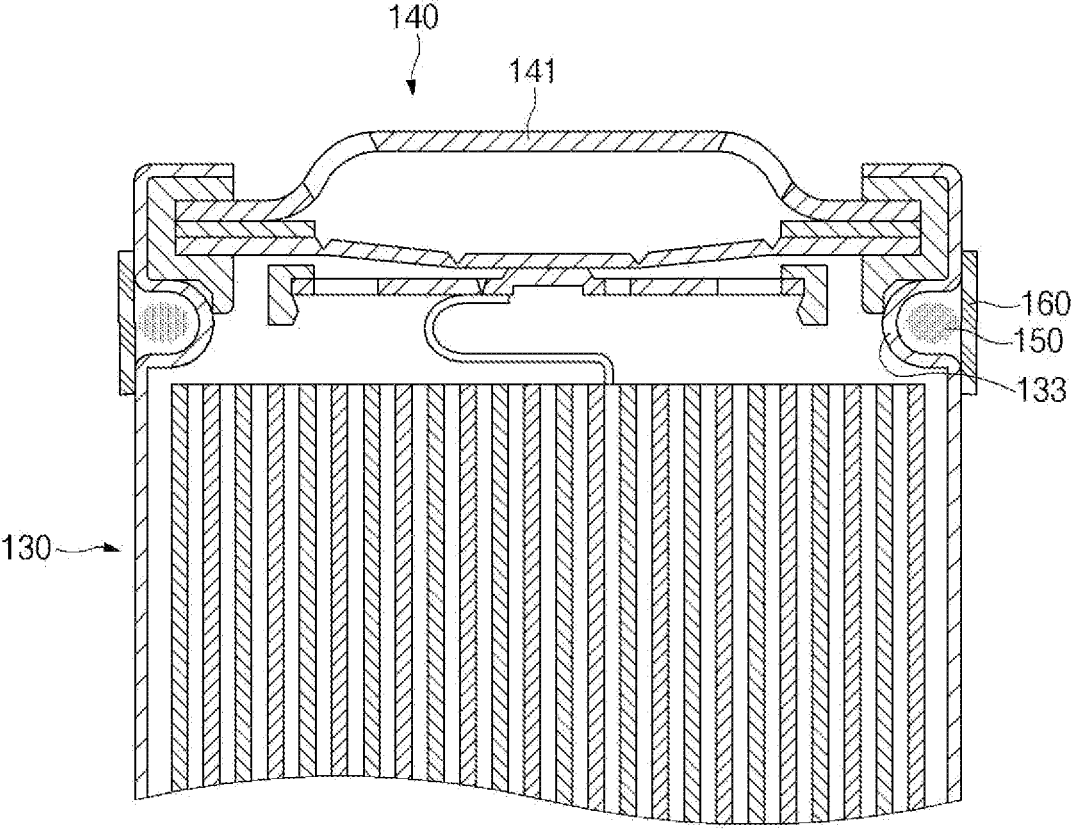
FIG. 2 is a cross-sectional view illustrating a state before an extinguishing agent is ejected in the secondary battery according to an embodiment of the present invention.
Figure 3:
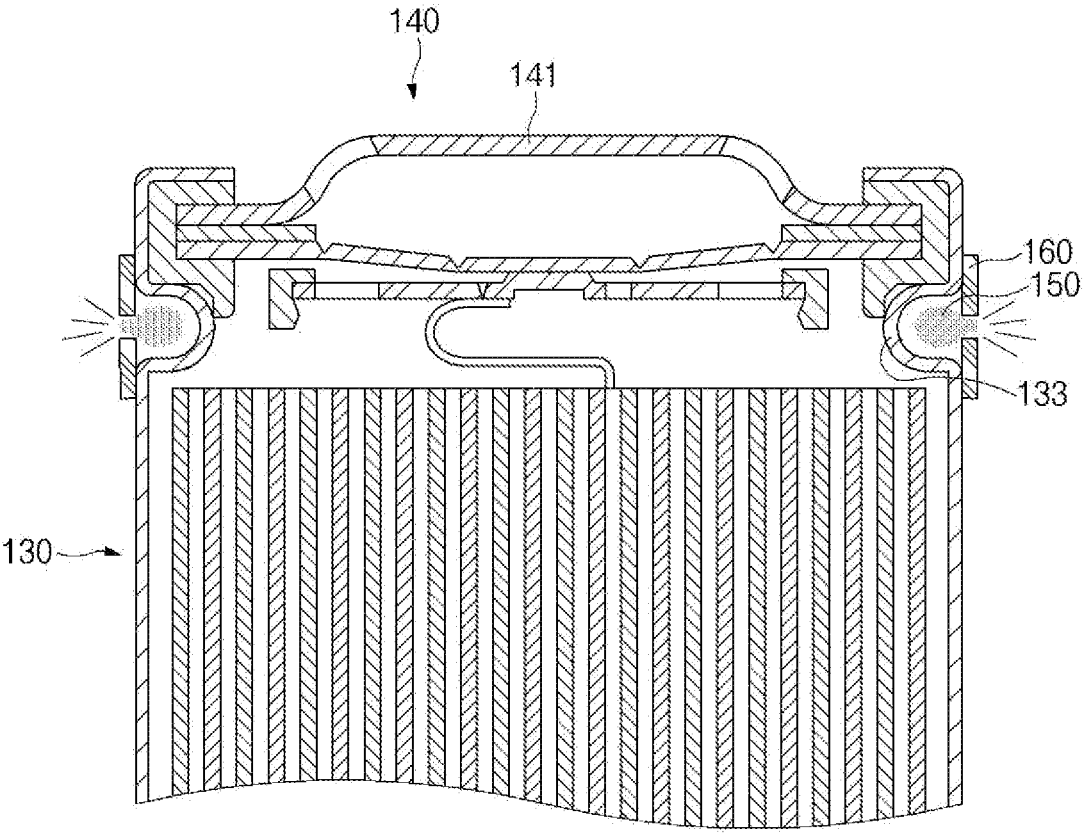
FIG. 3 is a cross-sectional view illustrating a state in which the extinguishing agent is being ejected in the secondary battery according to an embodiment of the present invention.

FIG. 1 is a cross-sectional view of a secondary battery according to an embodiment of the present invention, FIG. 2 is a cross-sectional view illustrating a state before an extinguishing agent is ejected in the secondary battery according to an embodiment of the present invention, and FIG. 3 is a cross-sectional view illustrating a state in which the extinguishing agent is being ejected in the secondary battery according to an embodiment of the present invention.

Referring to FIGS. 1 to 3, a secondary battery 100 according to an embodiment of the present invention comprises an electrode assembly 110, a can 130 accommodating the electrode assembly 110, a cap assembly 140 covering an opening 132 of the can 130, an extinguishing agent 150 extinguishing fire when ignition occurs, and a sealing part 160 sealing a recessed groove 134. In more detail, the electrode assembly 110 may be a chargeable and dischargeable power generation element and have a structure in which an electrode 113 and a separator 114 are alternately stacked. Here, the electrode assembly 110 may be formed in a shape in which the electrodes 113 and the separator 114 are alternately stacked to be wound. Here, the electrode assembly 110 may be provided in a shape that is wound in a circular or oval shape.

The electrodes 113 may comprise a positive electrode 111 and a negative electrode 112. Also, the separator 114 separates and electrically insulates the positive electrode 111 and the negative electrode 112 from each other. Here, in the electrode assembly 110, the positive electrode 111, the separator 114, and the negative electrode 112 may be alternately combined to be wound.

The positive electrode 111 may comprise a positive electrode collector and a positive electrode active material provided on one surface of the positive electrode collector. Here, the positive electrode 111 may comprise a positive electrode non-coating portion that is an area on which the positive electrode active material is not stacked.

For example, the positive electrode collector may be provided as foil made of an aluminum material.

The positive electrode active material may comprise lithium manganese oxide, lithium cobalt oxide, lithium nickel oxide, lithium iron phosphate, or a compound or mixture containing at least one of the above-described materials.

The negative electrode 112 may comprise a negative electrode collector and a negative electrode active material stacked on one surface of the negative electrode collector. Here, the negative electrode 112 may comprise a negative electrode non-coating portion that is an area on which the negative electrode active material is not stacked.

The negative electrode collector may be made of, for example, a copper foil made of a copper (Cu) material.

The negative electrode active material may comprise synthetic graphite, lithium a metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

The separator 114 may be made of an insulating material to insulate the positive electrode 111 and the negative electrode 112 from each other.

Also, the separator 114 may be, for example, a multi-layered film produced by microporous polyethylene, polypropylene, or a combination thereof or a polymer film for solid polymer electrolytes or gel-type polymer electrolytes such as polyvinylidene fluoride, polyethylene oxide, polyacrylonitrile, or polyvinylidene fluoride hexafluoropropylene copolymers.

The can 130 accommodates the electrode assembly 110 therein, and an opening 132 may be formed in an upper end thereof. Here, the can 130 may be formed in a cylindrical shape in which an accommodation part 131, in which electrode assembly 110 is accommodated, is formed.

In addition, the can 130 may comprise a metallic material. Here, the can 130 may comprise, for example, an aluminum or copper material.

Furthermore, a beading part 133 formed to be bent inward so that the cap assembly 140 is mounted on the can 130 to form a recessed groove 134 in the outside thereof may be formed.

In addition, a crimping part 135 that wraps and fixes an edge of the cap assembly 140 may be formed on an upper portion of the beading part 133 of the can 130. Here, the crimping part 135 may comprise an outer circumferential portion formed in a longitudinal direction of the can 130 and an upper end perpendicular to the longitudinal direction of the can 130.

The cap assembly 140 may be seated on the beading part 133 to cover the opening 132 of the can 130.

In addition, the cap assembly 140 may comprise a top cap 141 disposed at an upper portion of the secondary battery 100, a safety vent 143 disposed below the top cap 141, a current blocking member 144 disposed below the safety vent 143, and a gasket 145 wrapping an outer circumferential surface of each of the top cap 141 and the safety vent 143. Here, the gasket 145 may seal and insulate a gap between the cap assembly 140 and the can 130.

The top cap 141 may have an outlet and be disposed at the upper outermost portion of the secondary battery 100.

In addition, the top cap 141 may comprise a protruding terminal on an upper end thereof and a positive electrode terminal electrically connected to the electrode assembly 110 accommodated in the secondary battery 100.

The safety vent 143 may be disposed inside the secondary battery 100 rather than the top cap 141. Thus, when an internal pressure of the secondary battery 100 increases, the safety vent 143 may be reversed in shape toward the top cap 141 so as to be ruptured.

The current blocking member 144 may be disposed below the safety vent 143 and comprise a central portion connected to the safety vent 143 and an outer portion that is not connected to the safety vent 143.

In the current blocking member 144, an upper end of the central portion thereof may be in contact with a lower end of a central portion 123 of the safety vent 143, and when the internal pressure increases, the central portion 123 of the safety vent 143 may move to the top cap 141, and the contact between the safety vent 143 and the current blocking member 144 may be released to release the electrical connection.

The secondary battery 100 according to an embodiment of the present invention may comprise an electrode lead 120 attached to the electrode 113 and electrically connected to the electrode 113.

The electrode lead 120 may comprise a positive electrode lead 121 connected to the positive electrode 111 and a negative electrode lead connected to the negative electrode 112.

Referring to FIG. 1, the positive electrode lead 121 may be formed in a direction, in which the cap assembly 140 is disposed, i.e., an upward direction and be electrically connected to the current blocking member 144, and the negative electrode lead may be electrically connected to a lower portion of the can 130 in a downward direction.

The extinguishing agent 150 may be accommodated in the recessed groove 134 of the can 130 to extinguish fire when the secondary battery 100 is ignited.

In addition, the extinguishing agent 150 may be provided as the compressed extinguishing agent containing a compressed gas and thus be ejected when the secondary battery is ignited to extinguish fire.

Furthermore, the extinguishing agent 150 may be made of at least any one or more of a Halon gas, nitrogen, and carbon dioxide.

The sealing part 160 may seal the recessed groove 134. Thus, the recessed groove 134 of the can 130 in which the extinguishing agent 150 is accommodated may be sealed through the sealing part 160.

The sealing part 160 may comprise a rubber material. Thus, the extinguishing agent may be easily injected into the recessed groove 134. That is, for example, an injection syringe may pass through the sealing part 160 to inject the extinguishing agent 150 into the recessed groove 134, and then, heat may be applied to a portion through which the syringe passes to seal the portion, or the portion may be contracted by its own elastic force so as to be sealed.

The sealing part 160 may be made of adhesive rubber and thus be attached to the can 130 to cover the recessed groove 134. Here, after additionally adhering to the can 130 with the adhesive rubber, the heat and pressure may be applied so that the extinguishing agent is fixed to an outer surface of the can 130 through thermal fusion.

In the secondary battery 100, which is configured as the described above, according to an embodiment of the present invention, the extinguishing agent 150 may be disposed on the beading part 133 of the can 130, and a portion of the beading part 133, in which the extinguishing agent 150 is accommodated, may be sealed through the sealing part 160 to extinguish fire or prevent the fire from being spread through the extinguishing agent 150 when the battery is ignited. Particularly, the fire extinguishing agent 150 may be provided as the compressed extinguishing agent 150 containing the compressed gas and be ejected when the secondary battery 100 is ignited to extinguish fire in a surrounding space or prevent fire from being spread. Here, when the battery is ignited, the extinguishing agent 150 containing the compressed gas may be heated to release the sealing of the sealing part 160 and then be ejected, or the extinguishing agent 150 may be ejected to the portion of the sealing part 160, which is melted by heat of the ignition. Secondary Battery According to Another Embodiment Hereinafter, a secondary battery according to another embodiment of the present invention will be described.

Figure 4:
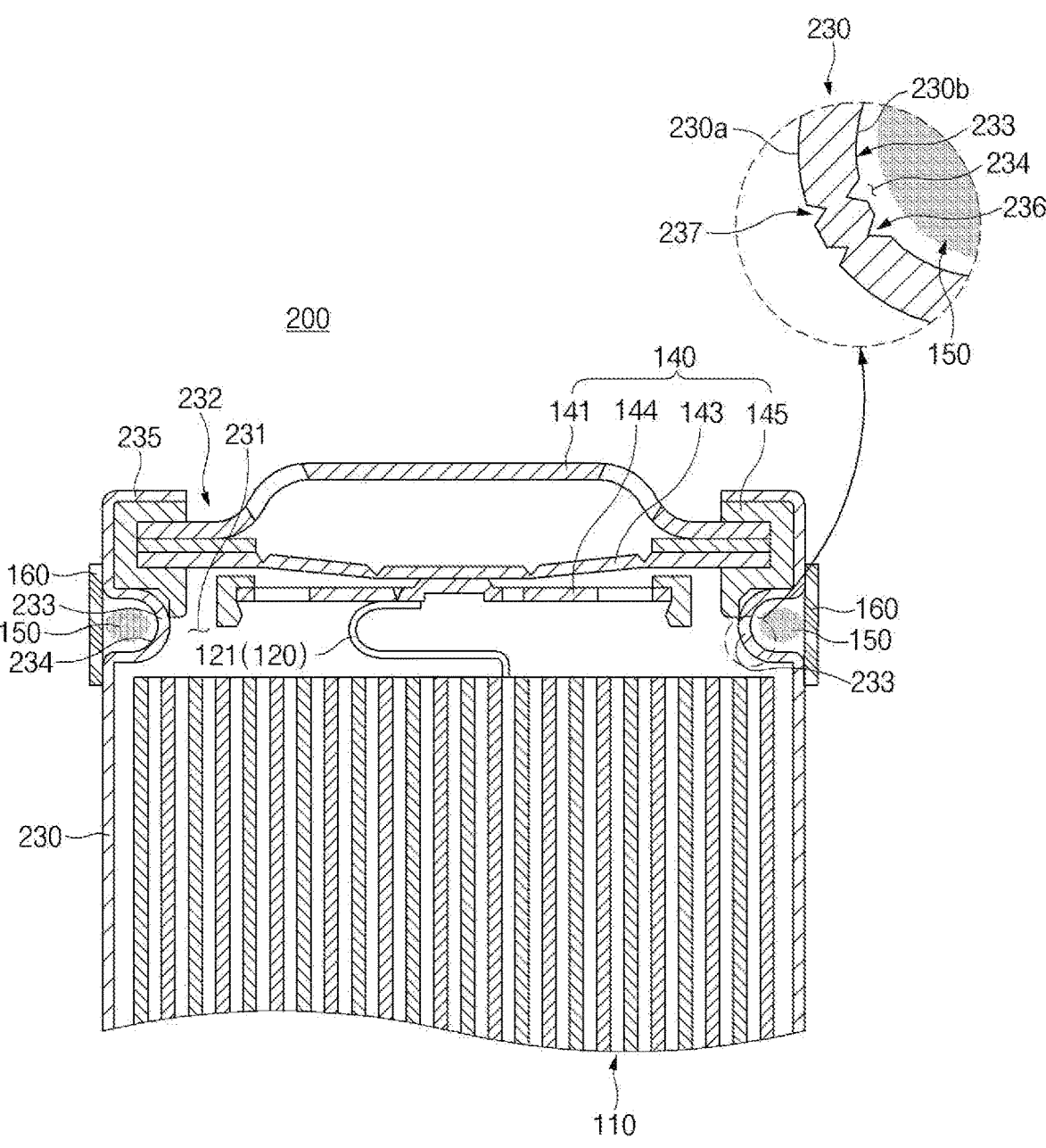
FIG. 4 is a cross-sectional view of a secondary battery according to another embodiment of the present invention.
Figure 5:
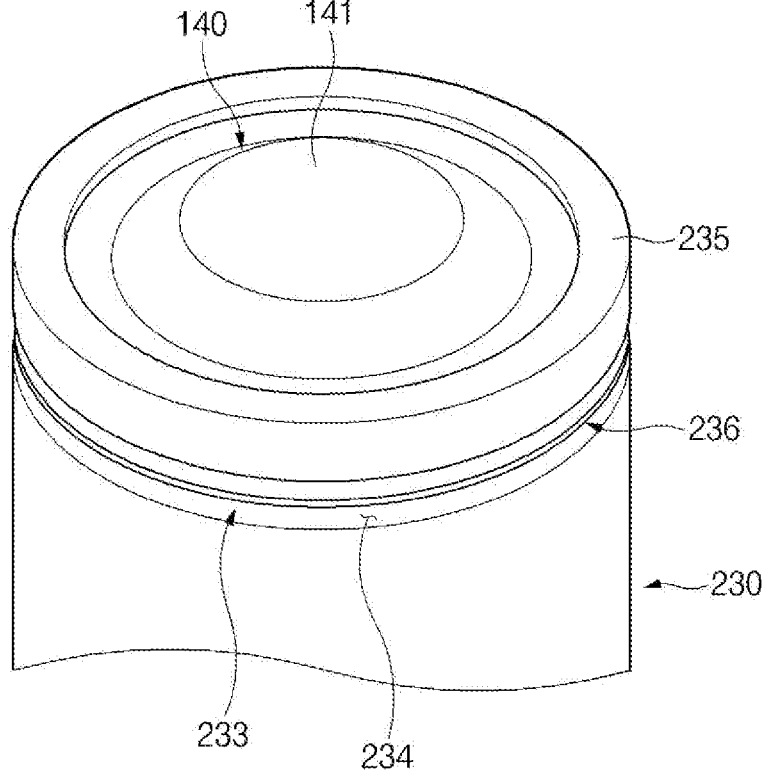
FIG. 5 is a perspective view of a can in the secondary battery according to another embodiment of the present invention.
Figure 6:
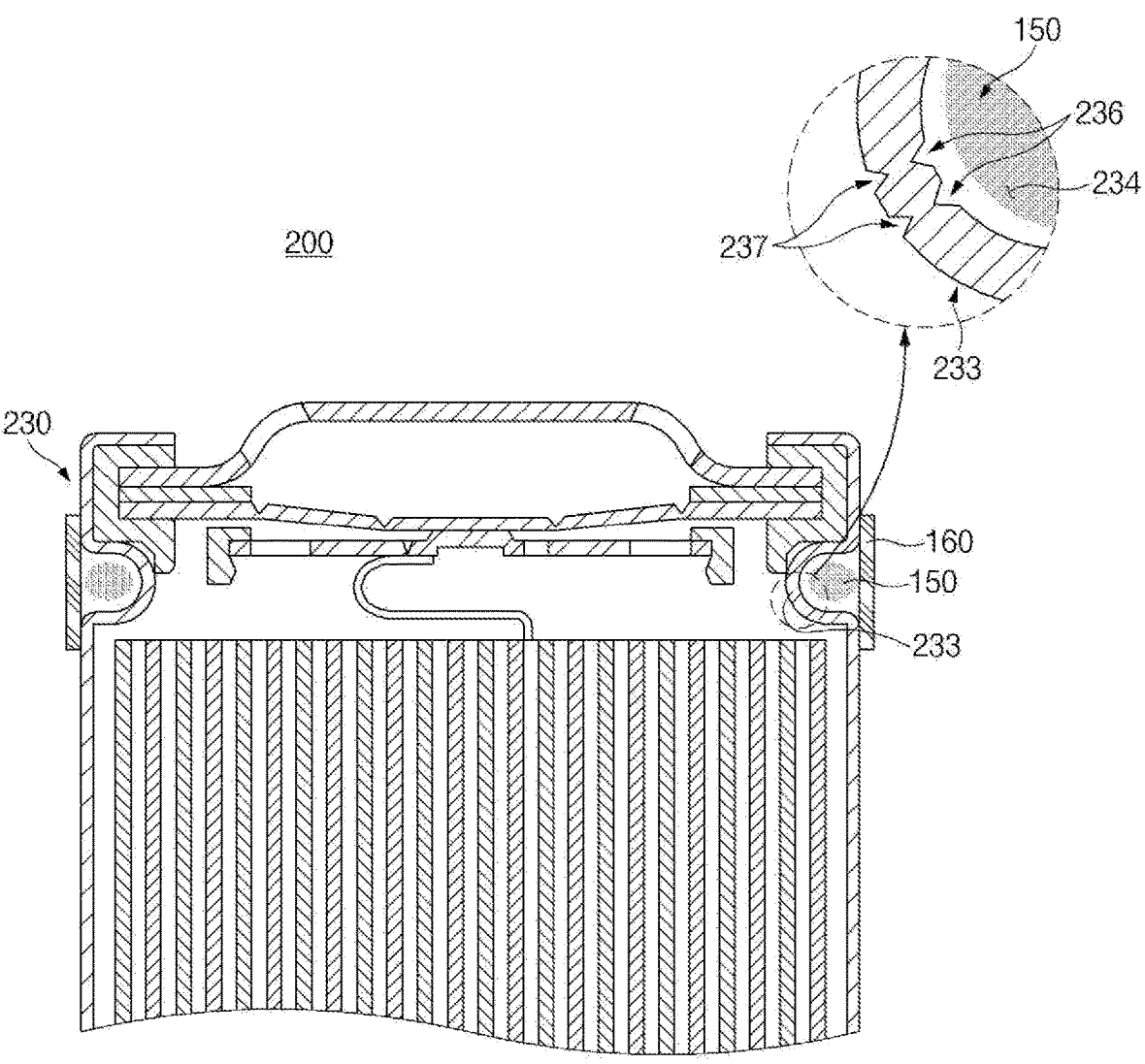
FIG. 6 is a cross-sectional view illustrating a state before an extinguishing agent is ejected in the secondary battery according to another embodiment of the present invention.
Figure 7:
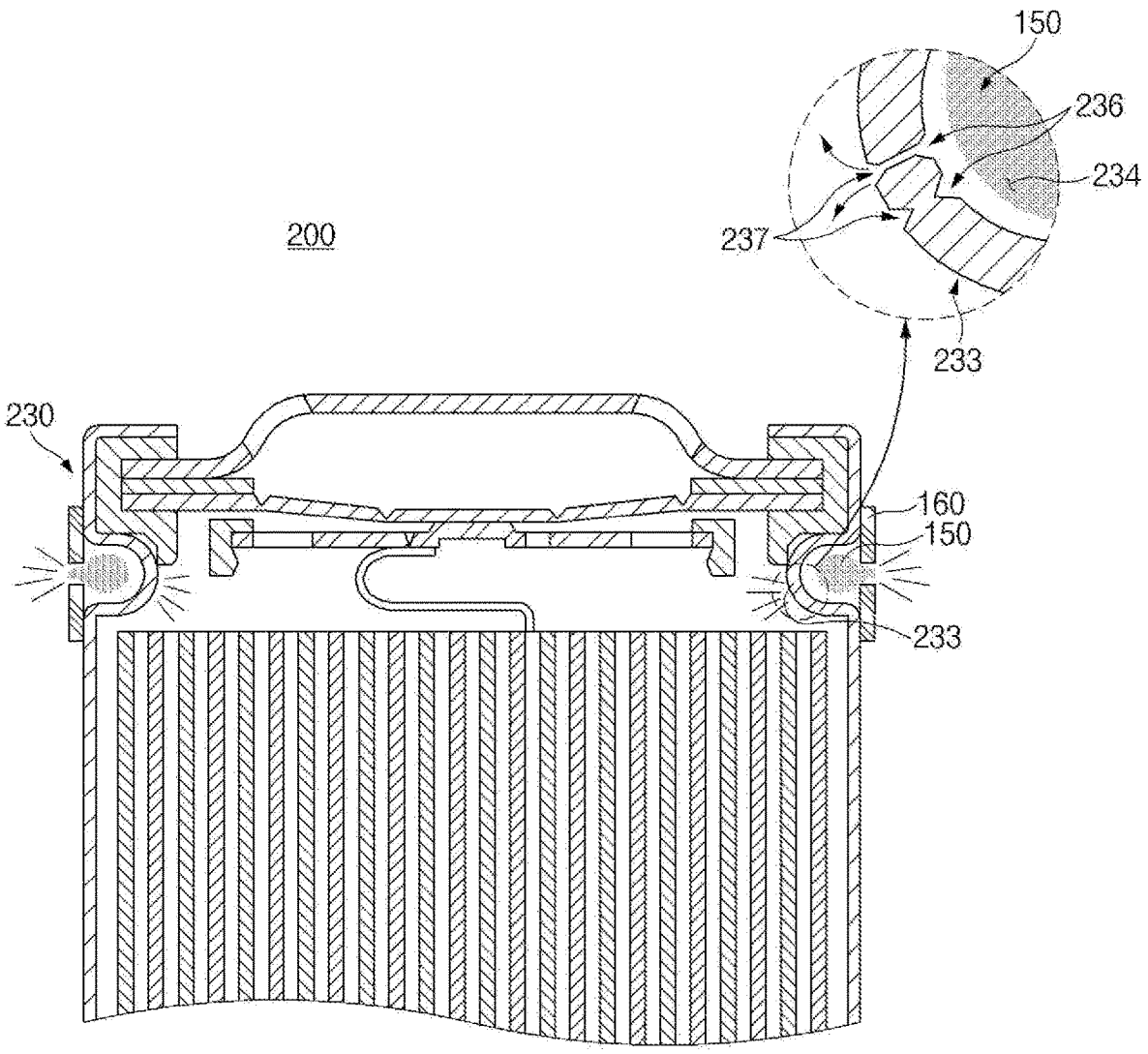
FIG. 7 is a cross-sectional view illustrating a state in which the extinguishing agent is being ejected in the secondary battery according to another embodiment of the present invention.

FIG. 4 is a cross-sectional view of a secondary battery according to another embodiment of the present invention, FIG. 5 is a perspective view of a can in the secondary battery according to another embodiment of the present invention, FIG. 6 is a cross-sectional view illustrating a state before an extinguishing agent is ejected in the secondary battery according to another embodiment of the present invention, and FIG. 7 is a cross-sectional view illustrating a state in which the extinguishing agent is being ejected in the secondary battery according to another embodiment of the present invention.

Referring to FIGS. 4 to 7, a secondary battery 200 according to another embodiment of the present invention comprises an electrode assembly 110, a can 230 accommodating the electrode assembly 110, a cap assembly 140 covering an opening 232 of the can 230, an extinguishing agent 150 extinguishing fire when ignition occurs, and a sealing part 160 sealing a recessed groove 234.

The secondary battery 200 according to another embodiment of the present invention is different from the secondary battery according to the foregoing embodiment of the present invention in that notches 236 and 237 are further formed on the beading part 233 of the can 230. Thus, in another embodiment of the secondary battery 200, contents duplicated with the secondary battery according to the forgoing embodiment of the present invention will be omitted or briefly described, and also, differences therebetween will be mainly described.

In more detail, the can 230 may accommodate the electrode assembly 110 therein, and an opening 232 may be formed in an upper end thereof. Here, the can 230 may be formed in a cylindrical shape in which an accommodation part 231, in which the electrode assembly 110 is accommodated, is formed.

In addition, the can 230 may comprise a metal material. Here, the can 230 may comprise, for example, an aluminum or copper material.

Furthermore, a beading part 233 formed to be bent inward so that the cap assembly 140 is mounted on the can 230 to form a recessed groove 234 in the outside thereof may be formed.

Notches 236 and 237 may be formed in the beading part 233. Thus, when the secondary battery 200 is ignited, the notches 236 and 237 of the beading part 233 may be ruptured, and thus, the extinguishing agent 150 accommodated in the recessed groove 234 may be ejected to easily extinguish fire in the surrounding space.

The notches 236 and 237 may be formed in at least one of an outer surface 230b and an inner surface 230a of the beading part 233. Here, each of the notches 236 and 237 may be formed in a triangular groove shape.

The can 230 may be formed in a cylindrical shape, and the notches 236 and 237 may be formed along an outer circumferential surface or an inner circumferential surface of the beading part 233. Here, the notches 236 and 237 may be discontinuously or continuously formed along the outer circumferential surface or the inner circumferential surface of the beading part 233.

Also, the notches 236 and 237 may be formed, for example, in one or more lines on the beading part 233.

Furthermore, the notches 236 and 237 may be melted by flame generated when the secondary battery 200 is ignited or may be ruptured by a high internal pressure generation due to the ignition, or the fire extinguishing agent 150 containing compressed gas may be heated by the heat of the ignition and thus be ruptured by the fire extinguishing agent 150 such as any one or more factors. Thus, an ejection passage for the extinguishing agent 150 between the accommodation part 231 of the can 230 and the recessed groove 234, in which the extinguishing agent 150 is accommodated may be formed in portions of the melted or ruptured notches 246 and 237. Thus, when the secondary battery 200 is internally ignited, the notches 236 and 237 may be melted or ruptured so that the extinguishing agent 150 is ejected into the secondary battery 200 to extinguish the internal ignition.

Here, the notches 236 and 237 may be ruptured, for example, at the same or higher pressure as a rupture pressure of the safety vent 143. The notches 236 and 237 may be ruptured, for another example, at a pressure lower than the rupture pressure of the safety vent 143.

A crimping part 235 that wraps and fixes an edge of the cap assembly 140 may be formed on an upper portion of the beading part 233 of the can 230.

The extinguishing agent 150 may be accommodated in the recessed groove 234 to extinguish fire when the secondary battery 200 is ignited.

In addition, the extinguishing agent 150 may be provided as the compressed extinguishing agent containing a compressed gas and thus be ejected when the secondary battery 200 is ignited to extinguish fire.

Furthermore, the extinguishing agent 150 may be made of at least any one or more of a Halon gas, nitrogen, and carbon dioxide.

The sealing part 160 may seal the recessed groove 234. Thus, the recessed groove 234 in which the extinguishing agent 150 is accommodated may be sealed through the sealing part 160.

In addition, the sealing part 160 may comprise a rubber material.

Furthermore, the sealing part 160 may be made of adhesive rubber and thus be attached to the can 230 to cover the recessed groove 234.

Also, when the battery is ignited, the extinguishing agent 150 containing the compressed gas may be heated to release the sealing of the sealing part 160 and then be ejected, or the extinguishing agent 150 may be ejected to the portion of the sealing part 160, which is melted by heat of the ignition.

Here, when the secondary battery 200 provided with the extinguishing agent 150 and the sealing part 160 are ignited, the ignition may be extinguished, and when fire occurs in the surrounding or adjacent batteries of the secondary battery 200, fire in the surrounding space may be easily extinguished.

A battery pack comprising the secondary batteries, which are configured as described above, according to an embodiment and another embodiment. The battery pack may comprise a plurality of secondary batteries and a battery pack case accommodating the plurality of secondary batteries. Here, the plurality of secondary batteries may be electrically connected in series or in parallel.

While the present invention has been particularly shown and described with reference to exemplary embodiments thereof, it is to be understood that the scope of the present invention is not limited to the secondary battery according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

100, 200: Secondary battery
110: Electrode assembly
111: Positive electrode
112: Negative electrode
113: Electrode
114: Separator
120: Electrode lead
121: Positive electrode lead
130, 230: Can
131, 231: Accommodation part
132, 232: Opening

133, 233: Beading part
134, 234: Recessed groove
135, 235: Crimping part
140: Cap assembly
141: Top cap
143: Safety vent
144: Current blocking member
145: Gasket
150: Extinguishing agent
160: Sealing part
230*a*: Inner surface
230*b*: Outer surface
236, 237: Notch

The invention claimed is:

1. A secondary battery comprising:
an electrode assembly in which electrodes and separators are alternately stacked and configured to be wound;
a can configured to accommodate the electrode assembly therein, having an opening in an upper end thereof, and provided with a beading part that is bent inward to form a recessed groove;
a cap assembly seated on the beading part to cover the opening of the can;
an extinguishing agent accommodated in the recessed groove to extinguish an ignition when the secondary battery is ignited; and
a sealing part configured to seal the recessed groove,
wherein a notch is formed in the beading part of the can.

2. The secondary battery of claim 1, wherein the extinguishing agent comprises a compressed extinguishing agent comprising a compressed gas so as to be ejected when the secondary battery is ignited, thereby extinguishing fire in a surrounding space.

3. The secondary battery of claim 1, wherein the extinguishing agent is made of at least any one or more of a Halon gas, nitrogen, and carbon dioxide.

4. The secondary battery of claim 1, wherein the sealing part comprises a rubber material.

5. The secondary battery of claim 1, wherein the sealing part is made of an adhesive rubber to adhere to the can so as to cover the recessed groove.

6. The secondary battery of claim 1, wherein the notch is formed in at least one of an outer surface or an inner surface of the beading part.

7. The secondary battery of claim 1, wherein the can is formed in a cylindrical shape, and
the notch is formed along an outer surface or an inner surface of the beading part.

8. The secondary battery of claim 1, wherein the notch is formed in a triangular groove shape.

9. A battery pack comprising the secondary battery of claim 1.

* * * * *